United States Patent
Mackenthun et al.

(10) Patent No.: US 6,868,482 B1
(45) Date of Patent: Mar. 15, 2005

(54) METHOD AND APPARATUS FOR PARALLEL STORE-IN SECOND LEVEL CACHING

(75) Inventors: Donald W. Mackenthun, Fridley, MN (US); Mitchell A. Bauman, Circle Pines, MN (US); Donald C. Englin, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/506,038

(22) Filed: Feb. 17, 2000

Related U.S. Application Data (62) Division of application No. 08/779,472, filed on Jan. 7, 1997, now Pat. No. 6,122,711.

(51) Int. Cl.⁷ .......................... G06F 12/08; G06F 11/16
(52) U.S. Cl. ....................................... 711/120; 711/124
(58) Field of Search ................................. 711/120, 121, 711/124, 141, 143, 146

(56) References Cited

U.S. PATENT DOCUMENTS

| | | | |
|---|---|---|---|
| 3,848,234 A | | 11/1974 | MacDonald |
| 4,442,487 A | | 4/1984 | Fletcher et al. |
| 4,445,174 A | | 4/1984 | Fletcher |
| 4,503,497 A | * | 3/1985 | Krygowski et al. ......... 711/124 |
| 4,521,851 A | | 6/1985 | Trubisky et al. |
| 4,530,055 A | | 7/1985 | Hamstra et al. |
| 4,551,799 A | | 11/1985 | Ryan et al. |
| 4,586,133 A | | 4/1986 | Steckler |
| 4,701,844 A | | 10/1987 | Thompson et al. |
| 4,707,784 A | | 11/1987 | Ryan et al. |
| 4,713,751 A | | 12/1987 | Dutton et al. |
| 4,719,568 A | | 1/1988 | Carrubba et al. |
| 4,733,352 A | * | 3/1988 | Nakamura et al. .......... 711/152 |
| 4,985,829 A | | 1/1991 | Thatte et al. |
| 5,023,776 A | | 6/1991 | Gregor |
| 5,025,365 A | | 6/1991 | Mathur et al. |
| 5,029,070 A | | 7/1991 | McCarthy et al. |
| 5,043,870 A | | 8/1991 | Ditzel et al. |
| 5,045,996 A | | 9/1991 | Barth et al. |
| 5,056,002 A | | 10/1991 | Watanabe |
| 5,095,424 A | | 3/1992 | Woffinden et al. |
| 5,130,922 A | * | 7/1992 | Liu ............................ 711/144 |
| 5,136,700 A | | 8/1992 | Thacker |
| 5,155,832 A | * | 10/1992 | Hunt .......................... 711/120 |
| 5,197,139 A | | 3/1993 | Emma et al. |
| 5,197,146 A | | 3/1993 | LaFetra |
| 5,206,945 A | | 4/1993 | Nishimukai et al. |
| 5,212,781 A | | 5/1993 | Shah |
| 5,214,770 A | | 5/1993 | Ramanujan et al. |
| 5,222,224 A | | 6/1993 | Flynn et al. |
| 5,241,641 A | | 8/1993 | Iwasa et al. |

(List continued on next page.)

Primary Examiner—B. James Peikari
(74) Attorney, Agent, or Firm—Charles A. Johnson; Mark T. Starr; Nawrocki, Rooney & Sivertson (57) ABSTRACT

Each dual multi-processing system has a number of processors, with each processor having a store in first-level write through cache to a second-level cache. A third-level memory is shared by the dual system with the first-level and second-level caches being globally addressable to all of the third-level memory. Processors can write through to the local second-level cache and have access to the remote second-level cache via the local storage controller. A coherency scheme for the dual system provides each second-level cache with indicators for each cache line showing which ones are valid and which ones have been modified or are different than what is reflected in the corresponding third level memory. The flush apparatus uses these two indicators to transfer all cache lines that are within the remote memory address range and have been modified, back to the remote memory prior to dynamically removing the local cache resources due to either system maintenance or dynamic partitioning.

5 Claims, 4 Drawing Sheets

U.S. PATENT DOCUMENTS

| | | | |
|---|---|---|---|
| 5,253,353 A | 10/1993 | Mogul | |
| 5,261,066 A | 11/1993 | Jouppi et al. | |
| 5,265,232 A | 11/1993 | Gannon et al. | |
| 5,265,235 A | 11/1993 | Sindhu et al. | |
| 5,276,836 A | 1/1994 | Fukumaru et al. | |
| 5,276,848 A | 1/1994 | Gallagher et al. | |
| 5,289,588 A * | 2/1994 | Song et al. | 711/120 |
| 5,293,595 A | 3/1994 | Caldarale et al. | |
| 5,307,477 A | 4/1994 | Taylor et al. | |
| 5,317,716 A * | 5/1994 | Liu | 711/144 |
| 5,355,467 A | 10/1994 | MacWilliams et al. | |
| 5,357,623 A | 10/1994 | Megory-Cohen | |
| 5,359,723 A | 10/1994 | Mathews et al. | |
| 5,386,547 A | 1/1995 | Jouppi | |
| 5,392,416 A | 2/1995 | Doi et al. | |
| 5,423,016 A | 6/1995 | Tsuchiya et al. | |
| 5,434,993 A | 7/1995 | Liencres et al. | |
| 5,490,261 A | 2/1996 | Bean et al. | |
| 5,524,233 A | 6/1996 | Milburn et al. | |
| 5,555,382 A | 9/1996 | Thaller et al. | |
| 5,581,727 A | 12/1996 | Collins et al. | |
| 5,603,005 A | 2/1997 | Bauman et al. | |
| 5,644,753 A | 7/1997 | Ebrahim et al. | |
| 5,778,433 A | 7/1998 | Collins et al. | 711/135 |
| 5,809,543 A * | 9/1998 | Byers et al. | 711/162 |
| 5,875,462 A * | 2/1999 | Bauman et al. | 711/119 |
| 5,960,455 A * | 9/1999 | Bauman | 711/120 |

* cited by examiner

METHOD AND APPARATUS FOR PARALLEL STORE-IN SECOND LEVEL CACHING

CROSS REFERENCES TO CO-PENDING APPLICATIONS

This patent application claims priority from U.S. patent application Ser. No. 08/579,897, entitled MULTI-PROCESSOR DATA PROCESSING SYSTEM WITH MULTIPLE SECOND LEVEL CACHES MAPABLE TO ALL OF ADDRESSABLE MEMORY, filed Dec. 28, 1995 by Bauman et al., now U.S. Pat. No. 5,875,462. Furthermore, this patent application is a divisional of U.S. patent application Ser. No. 08/779,472, entitled METHOD AND APPARATUS FOR STORE IN SECOND LEVEL CACHE FLUSH, filed Jan. 7, 1997, now U.S. Pat. No. 6,122,711. This patent application is also related to the co-pending U.S. patent application Ser. No. 08/579,683, entitled A MULTI-PROCESSOR DATA PROCESSING SYSTEM WITH MULTIPLE SEPARATE INSTRUCTION AND OPERAND SECOND LEVEL CACHES MAPABLE TO ALL OF ADDRESSABLE MEMORY filed Dec. 28, 1995 by Bauman et al., all of which are assigned to the assignee of the present invention, and incorporated herein by reference.

BACKGROUND OF THE INVENTION

1. Field of the Invention

This invention relates generally to cache architectures for processing systems having store in caches which can globally address a main memory, and more particularly to dynamically partition the globally addressable caches while retaining all current data.

2. Description of the Prior Art

Multi-processor data processing systems use multi-level caching to enhance system performance. A typical configuration includes first level caches dedicated to each processor, a second level cache shared by the processors, and a third level main memory shared by the processors. One variation uses a second level cache that maps to all of the addressable memory (i.e. is globally addressable) and can retain modified data that is different than what is reflected by the main memory (i.e. store in or post store).

U.S. Pat. No. 5,265,232 to Gannon et al. entitled, COHERENCE CONTROL BY DATA INVALIDATION IN SELECTED PROCESSOR CACHES WITHOUT BROADCASTING TO PROCESSOR CACHES NOT HAVING THE DATA, illustrates a centralized second level cache approach.

U.S. Pat. No. 5,136,700 to Thacker, entitled, APPARATUS AND METHOD FOR REDUCING INTERFERENCE IN TWO-LEVEL CACHE MEMORIES, illustrates a multiprocessor computer system with a number of processors coupled to a main memory by a shared memory bus, with one or more of the processors having a two level direct mapped cache memory. A special table is provided in the second cache which stores a pointer for each line in the first cache array which uses a look-up circuit to compare the pointer with the memory to determine, if a match exists, that the cache was updated. This system operates only upon data currently in use by a processor.

U.S. Pat. No. 4,713,751 to Dutton et al, entitled, MASKING COMMANDS FOR A SECOND PROCESSOR WHEN A FIRST PROCESSOR REQUIRES A FLUSHING OPERATION IN A Multi-processing SYSTEM, illustrates a masking circuit which senses the existence and type of commands stored in the command status registers associated with the system processors. Masking begins if it is determined that information needed by one processor is located in the cache memory of another processor and is to be flushed to the main processor. The masking circuit masks the command present in the command status register until after the information has been flushed from the cache to the main memory. This apparatus also operates only upon data immediately in use by a processor.

None of these provide separate second level cache memories for a number of processors which permit transferring data pertaining to one set of processors from one second level cache to the other prior to isolating the second level cache memories. It would be desirable if all current operand data pertaining to a remote system in the second-level caches of such systems could be transferred to the other second-level cache before powering down, or otherwise isolating the systems.

SUMMARY OF THE INVENTION

The present invention addresses the shortcomings of dual multi-processing system, where each multi-processing system has a number of processors each with store-through first level caches, has a store in second-level cache, has third level main memories, and where the second-level caches can globally address all of the main memories of both multi-processing systems, or where the second-level caches can address overlapping portions of the main memories. The present invention provides apparatus which automatically transfers all operands from a second-level cache in a multi-processing system, which were last modified by the other (i.e. remote) multi-processing system, to the remote system's second-level cache. This process is described here as "flushing" one system to the other. Flushing permits downing, or otherwise isolating one system from another, while insuring that all current operand data from the system being downed, which was last modified by the remote system, is transferred to the remote system before downing the first system to prevent losing any current operand data.

The instant invention uses the apparatus and cache coherency schemes and global addressing capability of typical dual multi-processor systems to indicate which operand data must be transferred. This invention adds hardware to each multi-processing system, which uses cache coherency scheme tags, associated status bits and coherency apparatus to indicate which globally addressable operand data is to be transferred, and then automatically flushes that data to the remote processing system.

The cache coherency scheme utilizes two primary mechanisms. The first mechanism applies to the first level memories and uses store-through first level cache memories to second level cache memories and an invalidate mechanism. The second mechanism provides the global second level cache memories with a combination of invalidate and tracking as to which global second level cache was the last to modify cached data ("last-modified").

The first level cache invalidate mechanism uses Duplicate Tags in each Storage Controller to provide a copy of the updated first level cache Tag. A respective Duplicate Tag is updated when a first level cache and its tag are updated on a read-miss of the first level cache, that is a tag value is written to the first level cache tag directory along with setting a valid bit in the valid file for this cache line. When any instruction processor performs a write operation, the write operation will be passed to the local storage controller. In this process, the local storage controller searches all of its Duplicate Tags and, if there is a cache line match, it will notify the appropriate instruction processor which is to be invalidated. The instruction processor will clear a valid bit associated with that cache line in its valid file. For those Duplicate Tags where there is no match, nothing more needs to be done, the first level cache coherency check is complete, that is those associated instruction processors do not have the modified cache line in their first level cache.

For a second level cache to allow a write to occur in its storage, the store in algorithm requires that it must first be designated as being the global owner of the cache line, with only one being allowed to be so designated. If so designated, a second level cache will process a write immediately, but otherwise the local second level cache must check the remote Storage Controller for a copy of the data. While the remote Storage Controller is checking for the copy, it also searches all of its remote Duplicate Tags and invalidates all instruction processor first level cache tags that match. If the remote Storage Controller has a copy of the data, the data is returned to the local Storage Controller and the remote Storage Controller invalidates its second level cache tag. This clears all remote caches of the requested cache line. The local Storage Controller is the n designated as having ownership of the cache line and therefore subsequent write operations from local processors do not require remote site interrogation.

This status indicated by valid bit and last-modified bit, associated with each Tag for each operand stored in the Storage Controller second level cache, is used in the instant invention to determine which operand data must be flushed from the local system being downed to the remote system. The selected operand data to be flushed is that data which was last modified by the remote system as indicated by the two coherency status bits associated with each operand Tag.

Additional hardware required to accomplish the flushing operation is provided for each System Controller. This apparatus uses the two coherency status bits, described above and also the address, to automatically determine which owned cache lines in the local second level cache are associated with the address range of the remote memory; and to flush these cache lines back to the remote memory. Cache lines that are only copies (not owned) of information from the remote memory address range do not need to be flushed, since they are duplicates of the same information that is currently resident in the remote memory. No additional first level cache coherency action needs to be performed associated with these flushed cache lines, because they were previously invalidated in the remote storage controller prior to the local second level cache obtaining their ownership of them.

The flushing operation can be initiated by the operator using an the existing System Control Facility and Network Interface Modules (NIM) associated with each dual processing system which controls the operation of the overall dual multi-processing system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
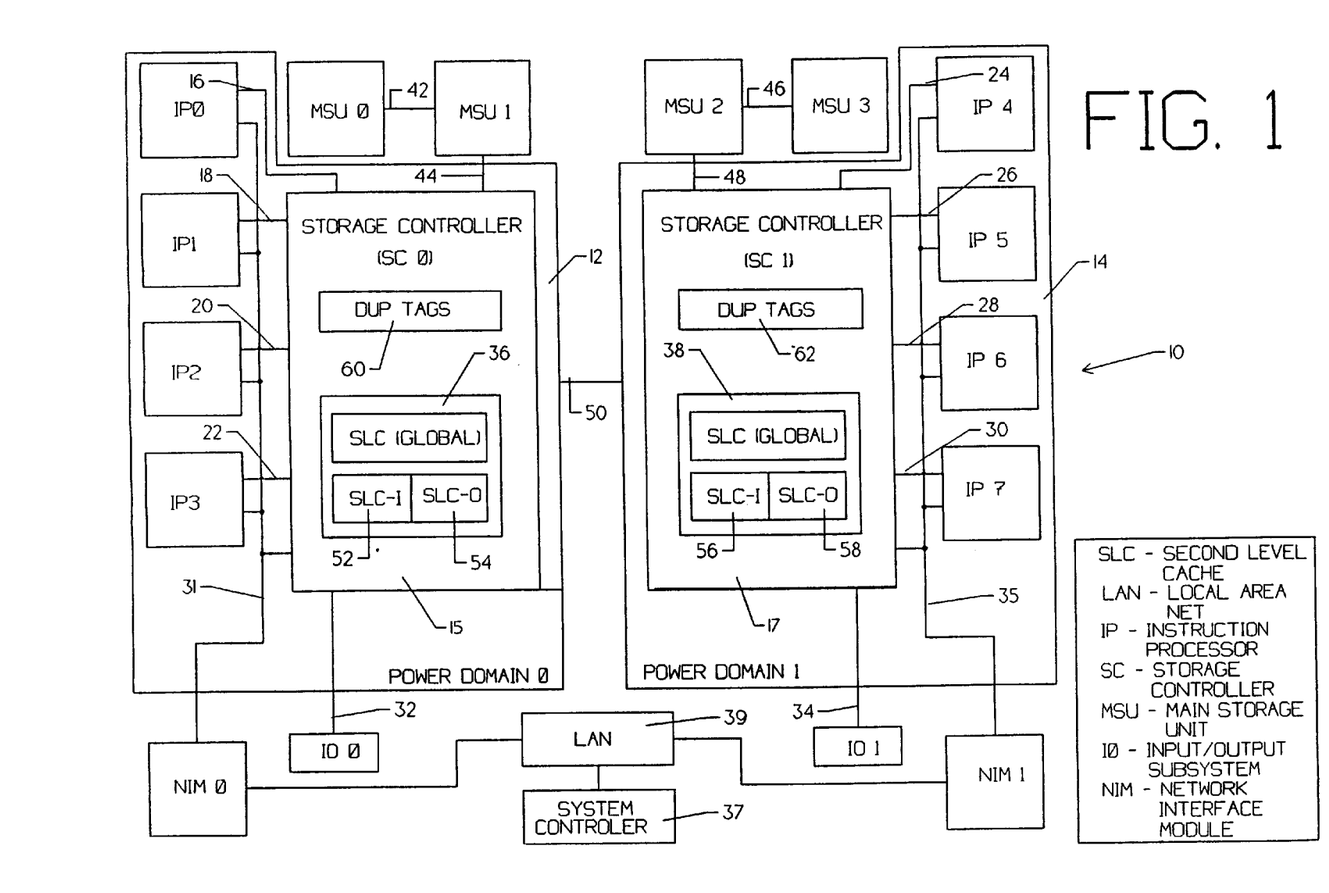
FIG. 1 is a block diagram of the dual multi-processing system.

A block diagram of a representative dual multi-processing system 10, made up of two multi-processing clusters 12 and 14, is shown in FIG. 1. Cluster 12 being powered by power domain 1 and cluster 14 being powered by power domain 2. System 10 also has a cache coherency scheme, described below, and global memory mapping.

Dual multi-processing system 10 comprises Instruction Processors, IP 0, IP 1, IP 2, IP 3, IP 4, IP 5, IP 6 and IP 7. Each processor has a dedicated store-through first-level cache, which includes a dedicated instruction cache and a separate dedicated operand cache, not shown in this figure. The operand first-level cache operates as a store-through cache where all write operands are passed on to the second-level cache. If the requested write operand is not resident in the operand first-level cache, the operand is not made resident in the operand first-level cache. Blocks of instructions and operands are made resident in the first-level caches only on read-misses.

Dual multi-processing system 10 has two Storage Controllers, SC 0 and SC 1. Each of the Storage Controllers is coupled to four of the IPs. Lines 16, 18, 20, and 22 show the respective connections between IP 0, IP 1, IP 2, IP 3 and SC 0. Lines 24, 26, 28 and 30 show the connections between IP 4, IP 5, IP 6, IP 7 and SC 1. Lines 31 connect Network Interface Module (NIM) 0 to IP 0, IP 1, IP 2, IP 3, IP 4 and SC 0, and lines 35 connect NIM 1 to IP 4, IP 5, IP 6, IP 7, and SC 1. NIMs 0 and 1 provide a variety of control and maintenance functions for clusters 12 and 14 respectively of system 10.

System Controller 37 is connected to Local Area Network (LAN) 39 which provides inputs respectively through NIM 0 and NIM 1 to respective control clusters 12 and 14. This permits System Controller 37 to provide overall control of multi-processing clusters 12 and 14 respectively of dual-processing system 10.

Memory requests can also come from components within Input/Output Subsystem (IO) 0 and IO 1 which are coupled to SC 0 and SC 1 by lines 32 and 34 respectively.

SC 0 and SC 1 each have a respective Global Second Level Cache (SLC) 36 and 38. Each SLC is mappable to all of the system's total addressable memory. The total addressable memory includes Main Storage Unit (MSU) 0, MSU 1, MSU 2 and MSU 3. MSU 0 being connected to MSU 1 by lines 42 and MSU 1 being connected to SC 0 by lines 44. MSU 3 being connected to MSU 2 by lines 46, and MSU 2 being connected to SC 1 by lines 48.

Storage controller 15 is connected to Storage Controller 17 by line 50. With this arrangement SLC 36 can be addressed directly by IP 0, IP 1, IP 2, IP 3 and IO 0, and indirectly, through SC 1, by IP 4, IP 5, IP 6, IP 7 and IO 1. Similarly, SLC 38 can be addressed directly by IP 4, IP 5, IP 6 IP 7, and IO 1, and indirectly, through SC 0, by IP 0, IP 1, IP 2, IP 3 and IO 0. All of the lines described above carry the various control, data and address information between the designated units.

SC 0 and SLC 36 are "local" relative to IP 0, IP 1, IP 2, IP 3 and IO 0, and are "remote" relative to IP 4, IP 5, IP 6, IP 7 and IO 1. Likewise SC 1 and SLC 38 are "local" relative to IP 4, IP 5, IP 6, IP 7 and IO 1, and are "remote relative to IP 0, IP 1, IP 2, IP 3 and IO 0. The SLCs are essentially dedicated to their "local" IPs but service "remote" requests from the remote storage controllers.

SLC 36 has a dedicated Instruction SLC (SLC-I) 52 and a dedicated Operand SLC (SLC-O) 54, and SLC 38 similarly has a dedicated Instruction SLC (SLC-I) 56 and a dedicated Operand SLC (SLC-O) 58. SC 0 also has a Duplicate (DUP) Tag 60 storage memory for duplicates of the first level cache tags from IP 0, IP 1, IP2 and IP3 and SC 1 also has DUP Tag 62 storage memory for duplicates of the first level cache tags from IP 4, IP 5, IP6 and IP7.

Cache coherency is accomplished with two arrangements. The store-through FLCs use an invalidate mechanism, and SLCs 36 and 38 use a combination of invalidate and tracking as to which SLC has ownership of the cache line.

The first level cache (FLC) invalidate mechanism has a valid file located in the respective IPs, and a uses the DUP Tags 60 and 62 that are located respectively in SC 0 and SC 1. The duplicated tags are essentially a copy of the respective FLC tag (not shown). The respective DUP Tag is updated when an IP updates its FLC tag on a read-miss of the FLC. When any local IP performs a write operation, the IP will write to its respective First Level Operand Cache (FLC-O) if the address is resident and then pass the write operation to the local Storage Controller. The local Storage Controller then searches the local Duplicate Tags. If there is a match, the appropriate IP is notified as to which cache line needs to be invalidated in its FLC tag. The IP then clears out the associated valid bit in its valid file. This forces the next read by the IP to result in a miss in its FLC and the updated information being fetched from the local storage controller. If the write address is not present in the FLC, the same invalidation scenario occurs, however no replacement occurs in the FLC.

An "ownership" arrangement is used by the SLCs 36 and 38 to coordinate cache coherency. In order for a SLC to allow a write to occur in its storage, it must first be designated as being the SLC that owns the specified cache line. Only one SLC is allowed to be designated as being the owner of a cache line. If a SLC is already designated as owning a cache line, when a write operation for the address is received, the write operation is processed immediately. If the SLC is not designated as owning the cache line when the write operation is received, then the remote SLC is checked to see whether the remote SLC has a copy of the data. As the remote SLC is checking for a copy, it is also searching the remote Duplicate Tags and invalidating any FLC cache lines that match. If the remote SLC has a copy of the data, the data is returned to the local SLC and the remote SLC invalidates its copy of the cache line. This purges all remote caches of the requested block. The local SLC is then designated as having ownership of the cache line, and any subsequent write operations from the local processors do not require invalidation to be performed at the remote caches.

Figure 2:
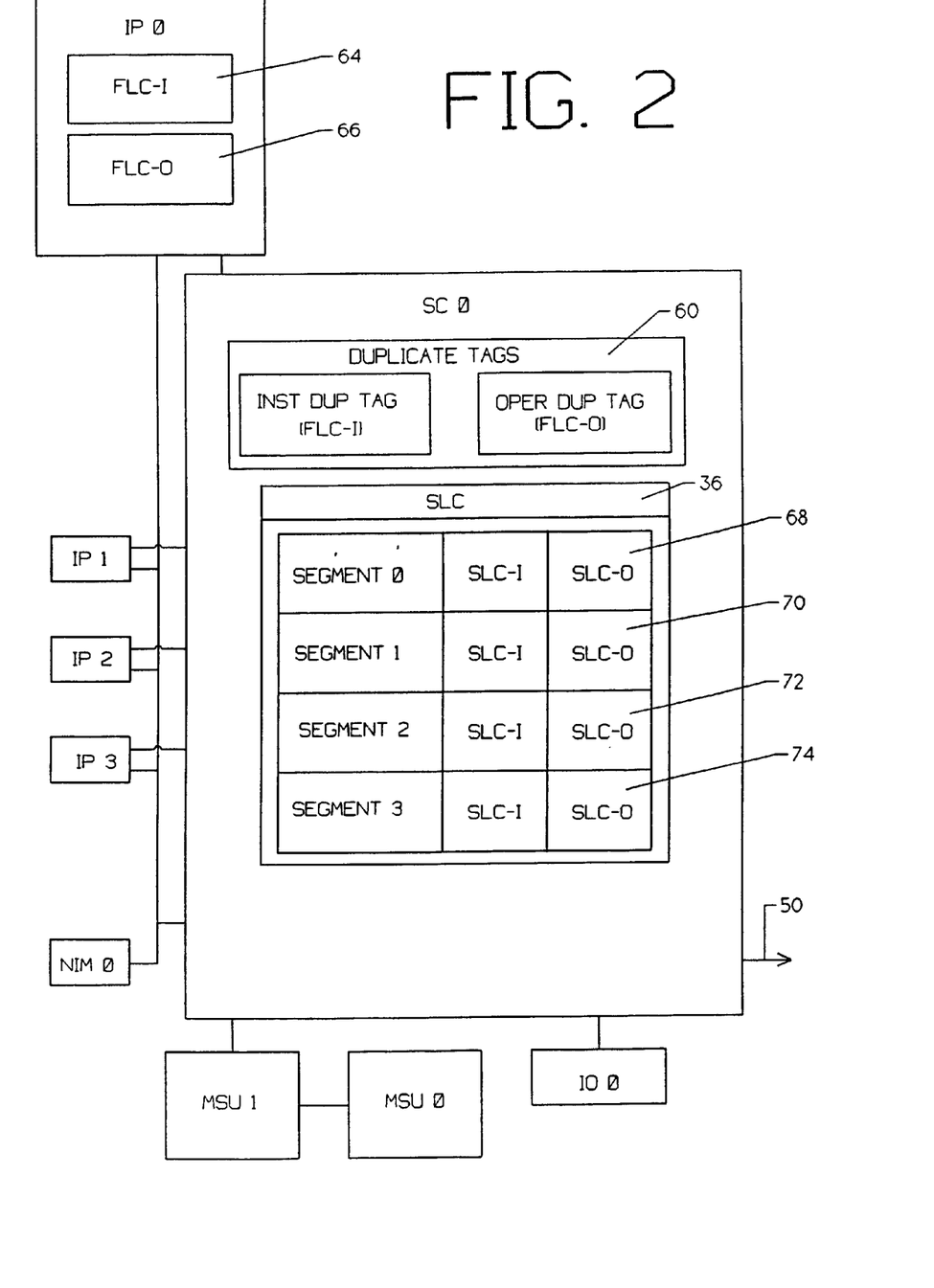
FIG. 2 is a block diagram of a portion of one of the individual processing systems.

FIG. 2 shows only elements of multi-processing cluster 12 to permit providing more detail. IP 0 has a first level cache for First Level Cache Instructions (FLC-I) block 64, and a First Level Operand Cache (FLC-O) block 66. This internal structure of IP 0 shown represents all instruction processors in both clusters 12 and 14.

FIG. 2 also shows additional details of SC 0. Block 60 contains Instruction Duplicate Tags (FLC-I) and Operand Duplicate Tags (FLC-0). The SLC-I and SLC-O of SLC block 36 are shown divided into four memory segments, Segment 0 block 68, Segment 1 block 70, Segment 2 block 72 and Segment 3 block 74. Each block is further divided into separate sections for instructions and for operands, designated SLC-I and SLC-O respectively. All four segments together are mapped to globally cover all addresses of MSU 0, MSU 1, MSU 2, and MSU 3.

Figure 3:
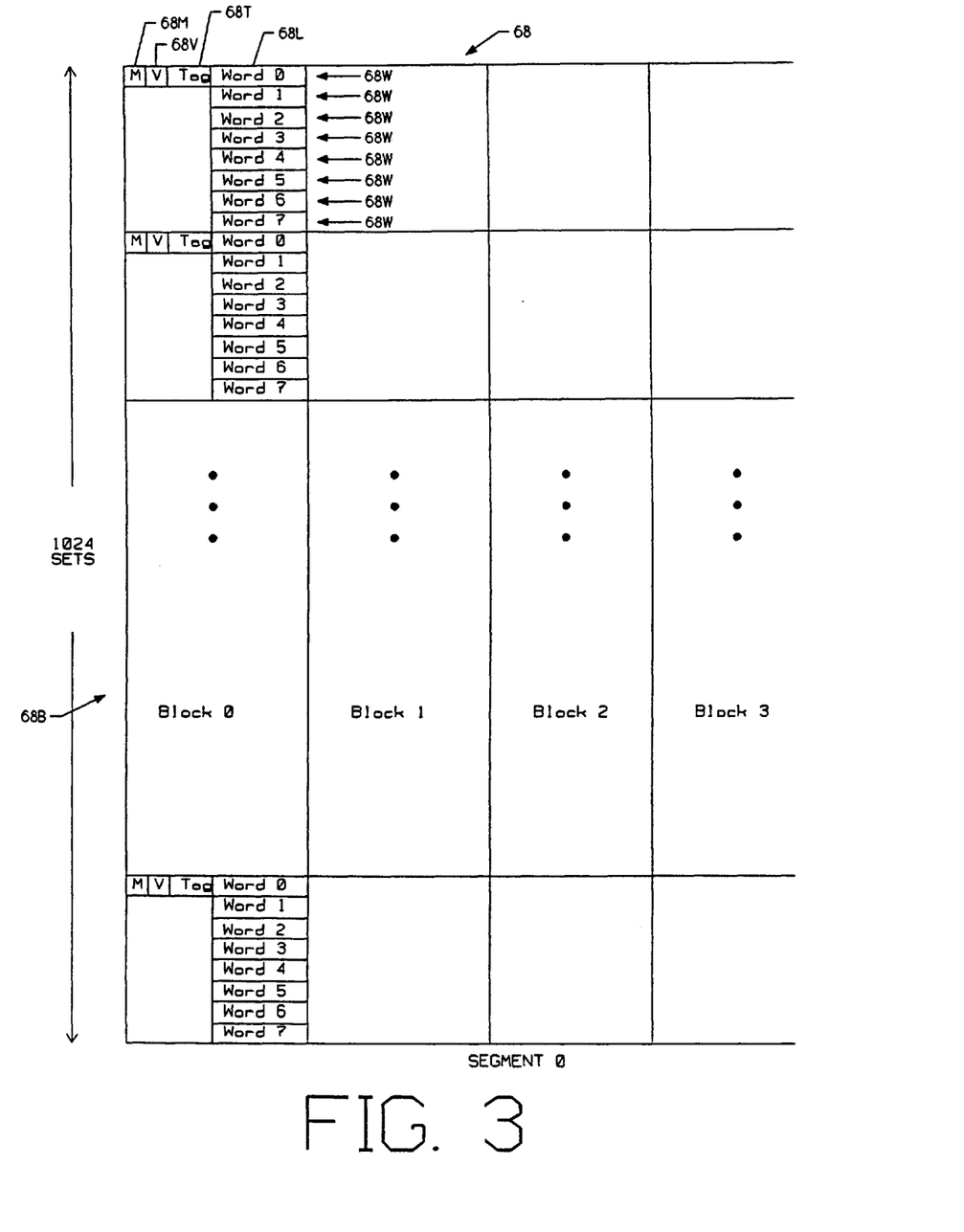
FIG. 3 shows the structure of a portion of the second-level cache memory.

FIG. 3 shows the SLC-O segment structure for segment 0 which is 68 of FIG. 2. All other segments 70, 72 and 74 are similarly structured. Each SLC segment 68, consists of 4 groups known as blocks 68B, block 0, block 1, block 2 and block 3. Each block consists of 1024 sets of cache lines 68L. Each cache line consists of eight 36-bit words of information, labeled 68W. Therefore, each SLC-O segment has 4×1024×8 or 32K words of information. Each cache line also has associated with it information about the cache line that is stored in the Tag portion of the SLC. Three relevant pieces of information are the M bit, the modified indicator bit 68M, the V bit, the valid bit 68V, and the block address information, Tag 68T. The full memory address of the cache line is made up of the following three parts: the segment number, the set address and the block address. Deciding whether a cache line is resident in the SLC-O involves accessing the Tag of the particular referenced segment, by using the set address portion of the requested address as a pointer into the Tag structure of the SLC. Then, comparing the block address portion to all four tag values, 68T, for all four Blocks 68B, 0–3. If there is a match and the valid indicator 68T is set, this indicates that the referenced cache line is in the SLC-O and can be assessed directly. If not, then the cache line needs to be fetched from main memory, only if the remote storage controller does not have the data. If the reference made is a store type reference indicating a change to the cache line, then the associated M indicator bit 68M, is set. This now indicates that the SLC-O contains updated information that is currently not reflected by the main memory. The valid indicator bit 68V is set when the cache line is written into the SLC-O from main memory during a replacement operation. A replacement operation takes place when a cache line is referenced by a processor but is not in the SLC-O, then the cache line is retrieved from main memory and stored into the SLC-O.

The cache lines to be flushed back to the remote memory are only those cache lines which are valid in the local SLC-O, have V bit 68V set, have been modified, modified M bit 68M set, and whose memory address is within the remote memory address range. All other cache lines are either already reflected by the remote memory or are associated with the local memory which is dynamically being removed and therefore the data associated with this address range does not need to be maintained and can be discarded.

Identical hardwired logic for flushing operand data between clusters 12 and 14 is provided in both systems. This hardwired logic provides the overall flush process 80, shown in FIG. 4, for the equipment described in FIGS. 1 and 2, and the segment organization shown in FIG. 3. Flush process 80 utilizes the existing coherency scheme and apparatus, described above for both processing clusters 12 and 14, as a point of departure.

Figure 4:
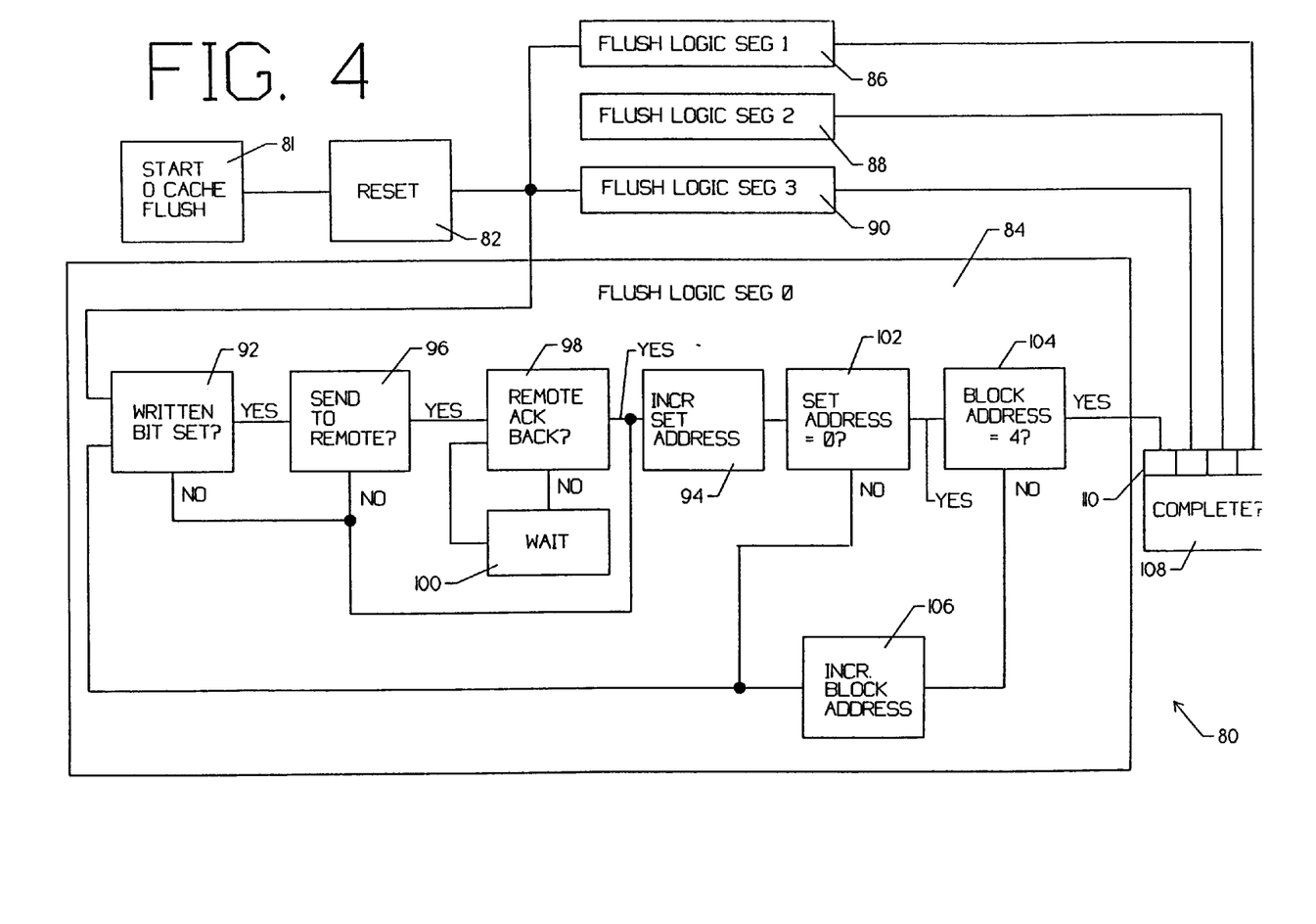
FIG. 4 shows the logic flow chart for the flush operation.

Process 80 is initiated by the operator deciding to remove the local cluster 12 from the system but at the same time leaving the remote cluster 14 in operation. The operator does this via System Controller 37, which controls both NIM 0 and NIM 1 through LAN 39. If SLC-0 of cluster 12 is to be flushed, then NIM block 30 is directed to initiate overall flush operation 80 in SC 0, while if system 14 is to be flushed NIM 1 is directed to initiate the flush operation in SC 1. Identical overall flush process 80 logic is resident in both storage controllers SC 0 and SC 1. For purposes of explanation it is assumed here that cluster 12 is to be flushed, however the hardwired logic and operation is the same whether cluster 12 or 14 is the one being flushed.

For this example, NIM 0 initiates flush operation 80 in SC 0, segment 0 by setting a specific bit in a dynamic instruction string sent to Storage Controller SC0. The hardware logic provided in each storage controller monitors this bit, and when it determines that it is set, enters Start Operand (O) Cache Flush block 81. All of the functions described for flush operation 80 are provided by identical hardwired logic in both SC 0 and SC 1. The other segments 1–3 are started in the same manner as described above for segment 0.

Block 81 passes control to Reset block 82. Block 82 resets two hardware counters provided in the flush apparatus to zero: a set address counter which counts up to 1024 and then rolls back to zero, and a block address counter which counts up to 4. To flush all four segments simultaneously, all four dynamic string bits must be set. Block 81 also clears a 4-bit register 110, which will be described later. Block 82 then passes control to four independent identical logic apparatus described for each of the following described segments which provide the flush operation, namely: Flush Logic Segment 0 block 84, Segment 1 block 86, Segment 2, block 88, and Segment 3 block 90. Blocks 84, 86, 88 and 90 perform an operand flush operation respectively on Segments 0 block 86, Segment 1 block 70, Segment 2 block 72 and Segment 3 block 74, and cause all four of these segments to be flushed simultaneously. Since the logic and operations of blocks 84, 86, 88, and 90 are identical, Flush block 84 only is described here.

Control in Flush block 84 is first passed to Written Bit Set? block 92. This causes block 92 to initially test Segment 0, Block Nos. 0–3 and its set number 0 in SLC-O block 68, because block 84 tests only Segment 0, and because the set and block number counters were both reset to 0 by block 82.

When initially testing Segment 0, Block No. 0, and its set number 0 in SLC-O block 68, a check is made to see if any written bits are set in blocks 0–3. If one or more bits are set, then the order for flushing this set address is from right to left. That is, block 3, block 2, block 1 and then block 0.

If for example, all four written bits are set for set number 0, then block 3 will be checked first to see if it is destined to the remote. When the increment set address counter goes through 1024 set addresses, such that the next address is Segment 0, Block 1 and set number 0, then block 2 will be checked to see if it is destined to the remote and so forth. So, the order is a right to left check of the written bits even though the block counter is incrementing in 0–3 fashion.

This test addresses the first associated written bit for block numbers 0–3 and set 0 in the Tag in SLC-O block 68, and if it none are set, the response is No and control is then passed to Increment set address block 94. Block 94 will increment the set address counter upward by one count and then pass control to block 102. The operation of block 102 will be described later.

If the response to block 92 is Yes, control is then passed to Send to Remote? block 96. Block 96 will check the first bit associated with the address in SLC-O block 68 and if the bit is not set, the cache line is associated with the local memory which does not require the cache line to be transferred to the remote system, i.e. No, and control will again be passed to block 94 to increment the set address counter upward by one and pass control to block 102.

If the response to block 96 is Yes, the cache line corresponding to that tag address was modified and is in the address range of the remote memory, and therefore must be sent to the remote Storage Controller, in this example SC 1, in which case control is passed to Remote Acknowledge (ACK) block 98. Block 98 will obtain the cache line addressed by that Tag address in SLC-O block 68 from that address in Segment 0 SLC-O block 68, send the eight cache line words in SLC-0 over line 50 to SC 1 in remote cluster 14, and test for a return acknowledgement of that transmission from SC 1. If an acknowledgment has not been received back, block 98 will pass control to Wait block 100 which will return control to block 98. This loop from block 98 through 100 and back to block 98 will provide a wait interval until the acknowledgment is received back from SC 1, at which time control will be passed to Increment Set Address block 94.

Block 94 will increment the set address number by one and pass control to Set Address=0? block 102. Block 102 will determine if the set address counter has rolled over to 0 after being incrementing upward by one in block 94, which indicates that the set address tested was 1024, and that all cache lines numbers in that block have been tested. If the set address counter has not rolled over to 0, control is passed to block 92 to test the next cache line.

If the set address has rolled over to 0, indicating that all 1024 addresses in the first block have been tested, control is then passed to Block Address=4? block 104. Block 104 will test the block number and if not equal to 4, indicating that all blocks have been tested, will pass control to Increment Block Address block 106.

Block 106 will increment the Block counter upward by 1 and return control to block 92 to begin the next cache line tests at the set address of 0 in the next block.

If the response to block 102 was Yes and all four blocks in that segment were tested, this indicates that the flush operation is complete. One of the bits in 4-bit register 110 is then set, and the flush operation for Flush Logic Segment 0 block 84 will be terminated and the start bit for segment 0 in the dynamic string relating to block 81 is cleared.

When Flush operation blocks 86, 88 and 90, which perform the same operations described above but on different operand cache memory segments, have also completed their respective flush operation, each will set a bit in 4-bit register 110 and terminate their flush operation and clear their respective start bits.

NIM 0 monitors register 110 during the flush operation and when all four bits of register 110 are set this indicates that the flush process is complete for all four memory segments. NIM 0 then indicates the flush complete status through LAN 39 to System Controller 37, which displays the complete flush status to the operator.

Cluster 14 has the same flush hardware in SC 1, as that described above for cluster 12, which operates in the same manner except that in cluster 14 operand data is flushed from cluster 14 to cluster 12 rather then from cluster 12 to 14 as described above.

While four hardware arrangements each of which flush cache lines from segments 0, 1, 2 and 3 are provided in this embodiment, a single arrangement could be used, such as that for block 84 only, with block 84 being reentered four times to flush four memory Segments. This would require adding a segment incrementing means and a segment counter after block 104 which is also initially set to zero, which counts up to four, and which then rolls back to zero. These would be followed by a means for determining when the count had incremented up to four to indicate that all four memory segments had been flushed before the flush operation would be terminated. This alterative arrangement can be provided readily by adding the above.

Flush process 80 utilizes information which is already required to ensure data coherency in a dual multi-processing system, when global first, second and third level memories are used. This flush operation permits removing one of the multi-processing clusters from a dual multi-processing system with no operand data loss, with a minimum of additional apparatus, and with a minimum of operator interaction.

The flush operation described here has addressed the specific flushing problem presented by in dual multi-processor systems with the described three level coherency scheme. This problem can also arise in a system with only two levels of memory, with two cache memories and a main memory, and with the caches having the ability to address overlapping portions of the main memory. This arrangement presents the possibility of data in the two caches addressing the same main memory data. Here if a first cache has the most recent version of data, and the data also appears in the overlapped portion of the main memory reachable by the second cache, if the first cache is isolated from the second cache, then the most recent data version in the first cache must be flushed to the second cache.

Various other modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus comprising:
    a) a first instruction processor;
    b) a shared memory unit;
    c) a first storage controller having a first store-in cache memory responsively coupled to said first instruction processor and to said shared memory unit;
    d) a second instruction processor;
    e) a second storage controller having a second store-in cache memory responsively coupled to said second instruction processor and to said shared memory unit; and
    f) a data path coupling said first storage controller and said second storage controller for transferring data from said first storage controller to said second instruction processor via said second storage controller.

2. The apparatus according to claim 1 wherein said first instruction processor further comprises a first level cache memory and said second instruction processor further comprises a first level cache memory.

3. The apparatus according to claim 2 wherein said first store-in cache memory and said second store-in cache memory are second level cache memories.

4. The apparatus according to claim 3 wherein said first store-in cache memory and said second store-in cache memory are second level operand cache memories.

5. The apparatus according to claim 4 wherein said first storage controller further comprises a signal generator whereby a signal is generated to signify when all determined data is transferred.

* * * * *

UNITED STATES PATENT AND TRADEMARK OFFICE
CERTIFICATE OF CORRECTION

PATENT NO. : 6,868,482 B1
DATED : March 15, 2005
INVENTOR(S) : Donald W. Mackenthun et al.

It is certified that error appears in the above-identified patent and that said Letters Patent is hereby corrected as shown below:

Column 10,
Line 16, after the term "controller" the terms -- wherein said first store-in cache memory comprises a tag store and said first storage controller further comprises a tag analysis circuit whereby said tag store is accessed to determine which data to transfer -- should be added.

Signed and Sealed this

Twenty-first Day of June, 2005

JON W. DUDAS
*Director of the United States Patent and Trademark Office*